Figure 3:
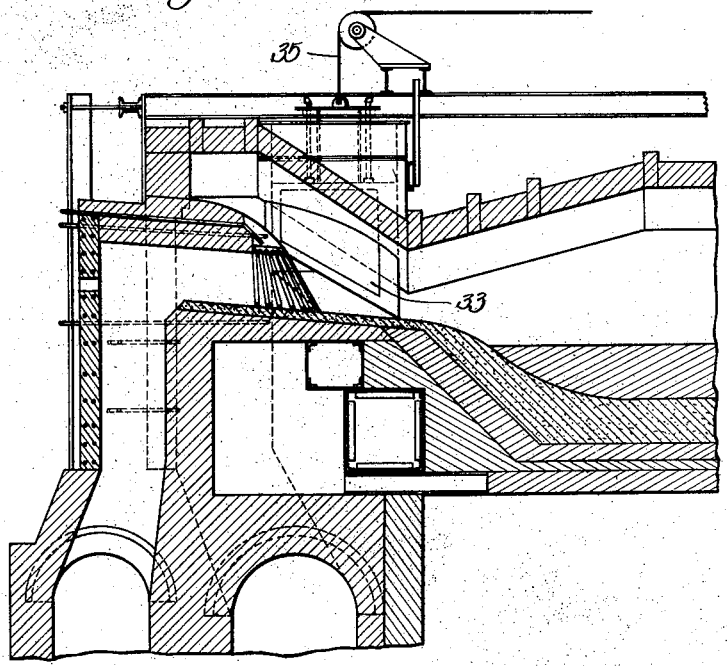
Figure 4:
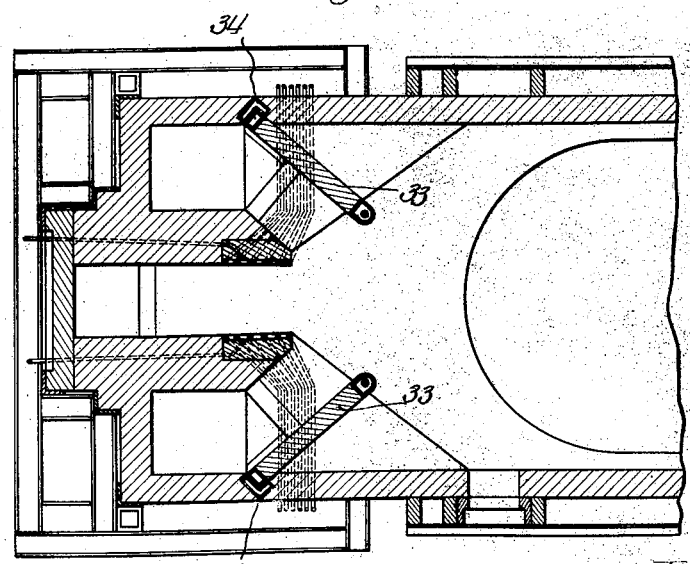
Figure 5:
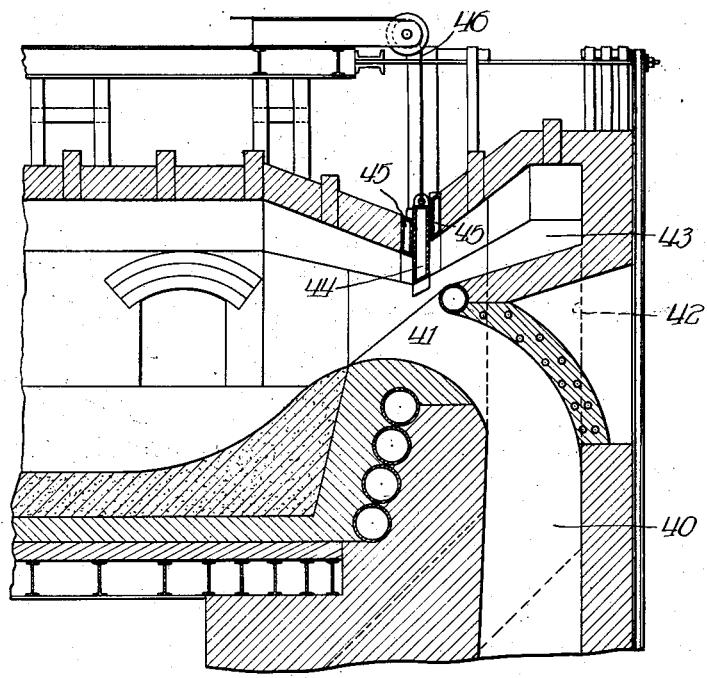
Figure 6:
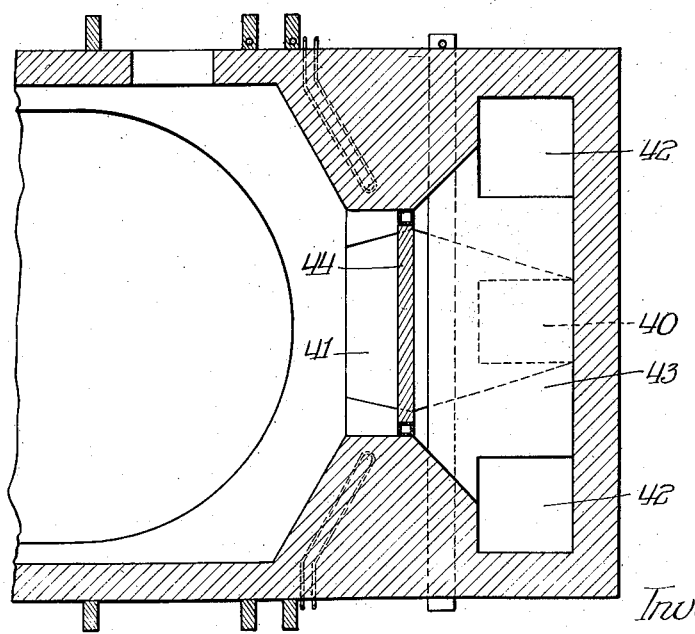

July 1, 1930. G. L. DANFORTH, JR 1,769,492
OPEN HEARTH FURNACE
Filed Sept. 26, 1921 7 Sheets-Sheet 2

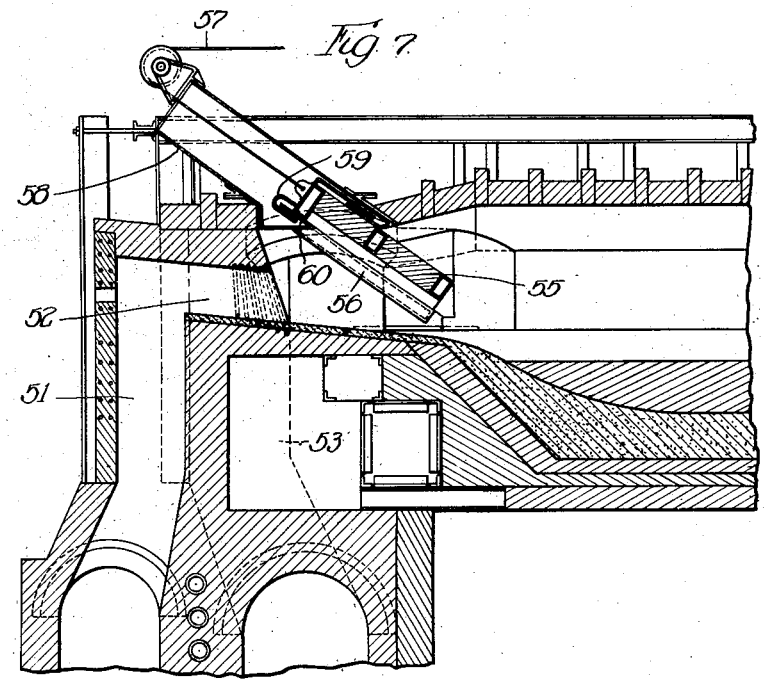
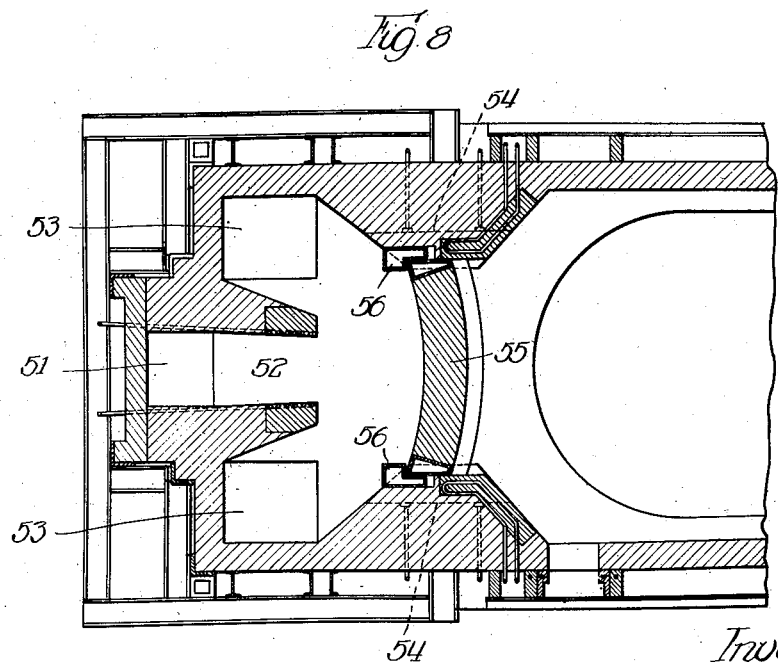

July 1, 1930. G. L. DANFORTH, JR 1,769,492
OPEN HEARTH FURNACE
Filed Sept. 26, 1921 7 Sheets-Sheet 5
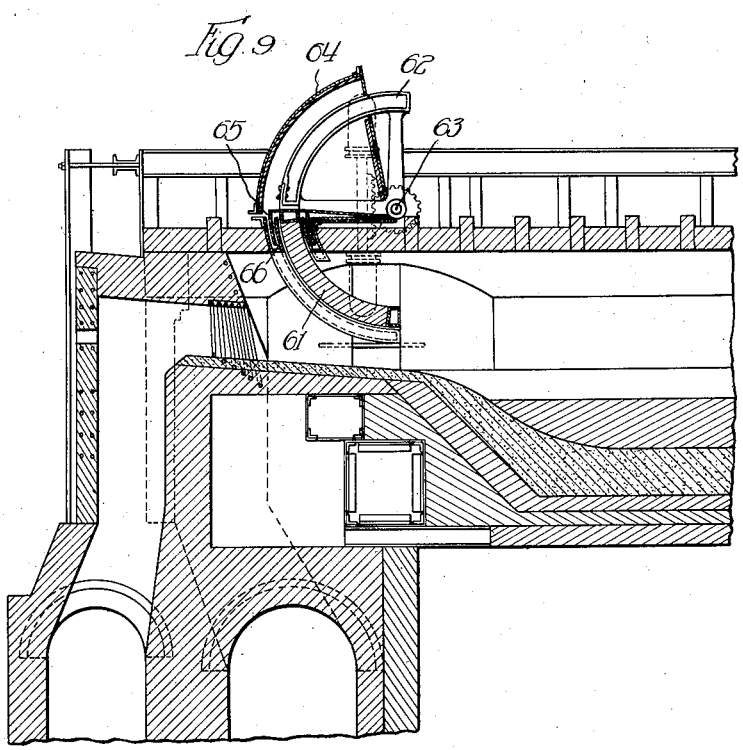
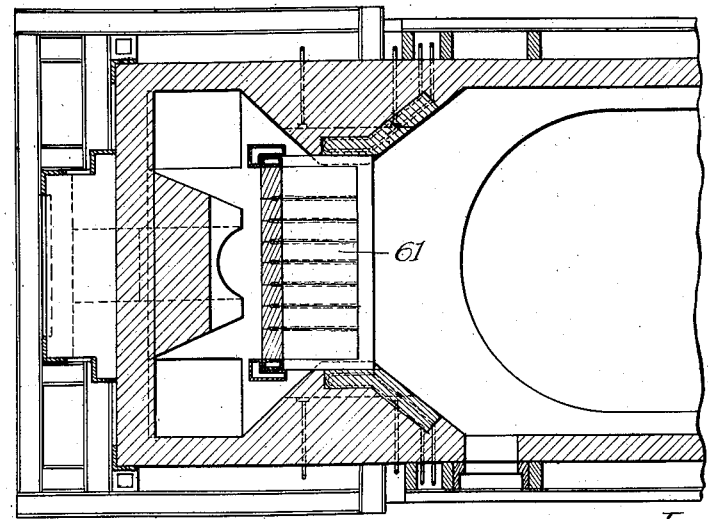
Witness:
P. Burkhardt
Inventor
George L. Danforth Jr., Patented July 1, 1930

1,769,492

UNITED STATES PATENT OFFICE

GEORGE L. DANFORTH, JR., OF CHICAGO, ILLINOIS, ASSIGNOR, BY MESNE ASSIGNMENTS, TO OPEN HEARTH COMBUSTION COMPANY, OF CHICAGO, ILLINOIS, A CORPORATION OF DELAWARE

OPEN-HEARTH FURNACE

Application filed September 26, 1921. Serial No. 503,241.

This invention relates to a new and improved open hearth furnace, and more particularly to a construction adapted to so direct the entering gases and air in an open hearth furnace as to produce a quick burning and intensely hot flame adapted to provide working heat adjacent the full surface of the metal in the furnace, and further adapted to provide a large port area through which to exhaust the products of combustion.

My invention comprises an improvement in that portion of an open hearth furnace between the ports and the bath or melting chamber, and the remainder of the furnace and its appurtenances may be of any usual construction. As is well known in open hearth practice, the furnace is double-ended and reversible, and is provided at each end with gas or air ports which serve upon the outgoing end to carry off the products of combustion. In certain types of these furnaces burning producer or like gases, these incoming gases are passed through regenerative chambers and are thus pre-heated. The incoming air is pre-heated in a similar manner and the heat of the furnace flame is correspondingly increased. It is highly desirable in such furnaces to provide a short, quick flame which is directed toward the metal in the bath and which does not extend to the outgoing end of the furnace. However, in actual practice, since the same ports serve both to introduce the air and gas and to carry off the products of combustion, the latter function has been largely the determining factor as regards the size of ports. This is for the reason that the products of combustion are of considerable greater volume than the incoming air and gas.

To secure a short, quick flame, it is essential that there be a quick and thorough mixture of the incoming air and gas. It is impractical to secure such a mixture and flame when the air and gas ports are of the usual comparatively large area. Endeavors are made to secure this quick mixture with such ports by surrounding the gas stream upon its sides and top and with the air stream. However, the intermixture in general occurs gradually as the gas is passed across the furnace, the lighter gas gradually rising and intermingling with the heavy air, combustion thus gradually taking place.

Endeavors have been made to secure a quick mixture and short flame by means of using comparatively small air and gas ports and providing auxiliary ports for carrying off the products of combustion, for example, as shown in the patent to Frank B. McKune, No. 1,339,855, issued May 11, 1920. In such constructions, dampers are provided to close the auxiliary passages upon the incoming end of the furnace. The addition of auxiliary ports and uptakes unduly complicates the structure and this is particularly true in the usual type of furnace burning producer or similar gases. In such furnaces, as generally constructed, a single gas uptake and port is flanked by an air uptake and port upon each side thereof. All these ports are essential to the operation of a furnace upon the incoming end, although as has been stated, the port area is increased over that necessary for the incoming air and gas in order to be of a size adequate to take care of the products of combustion.

It is an object of the present invention to provide means located intermediate the ports and the furnace chamber which means are adapted to vary the effective passage area between the ports and chamber.

It is a further object to provide means of this character which are adjustable to provide the full port area for handling the products of combustion.

It is an additional object to provide means which may be readily installed without undue modification of the existing furnace structure.

It is also an object to provide a device which is relatively simple in design, construction and operation.

Other and further objects will appear as the description proceeds.

Broadly my invention comprises the interposition of dampers between the ports and furnace chamber, these dampers being adjustable to vary the effective passage area. I have illustrated certain preferred embodithe ports to be effective for carrying off the products of combustion.

The form of device shown in Figures 9 and 10 is quite similar to that of Figures 7 and 8, the modification being that the damper is arcuate in form and is rotated instead of sliding in guideways. This arcuate damper 61 is carried by the frame 62 which latter is rotatable about the shaft 63. Rotation of the frame about this shaft serves to swing the damper upwardly out of the furnace and into the box 64. Flanges 65 on the damper frame interfit with flanges 66 upon the lower part of the box to prevent the passage of gases into the box when the damper is down.

Figure 11:
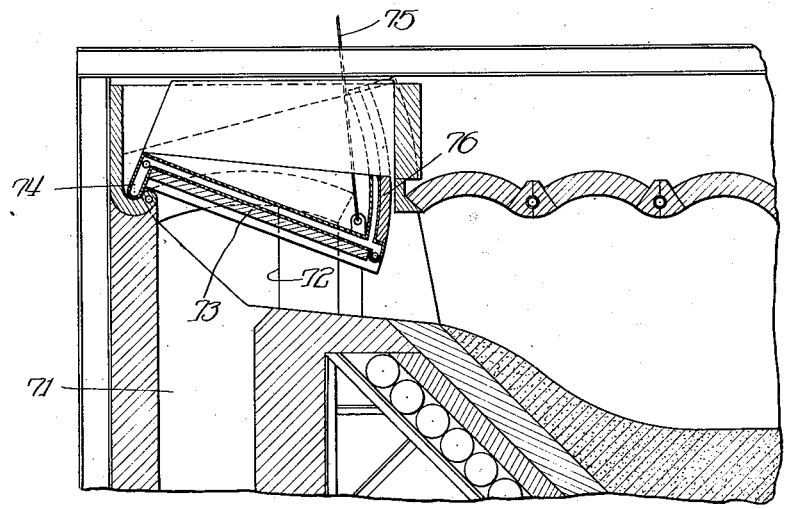
Figure 12:
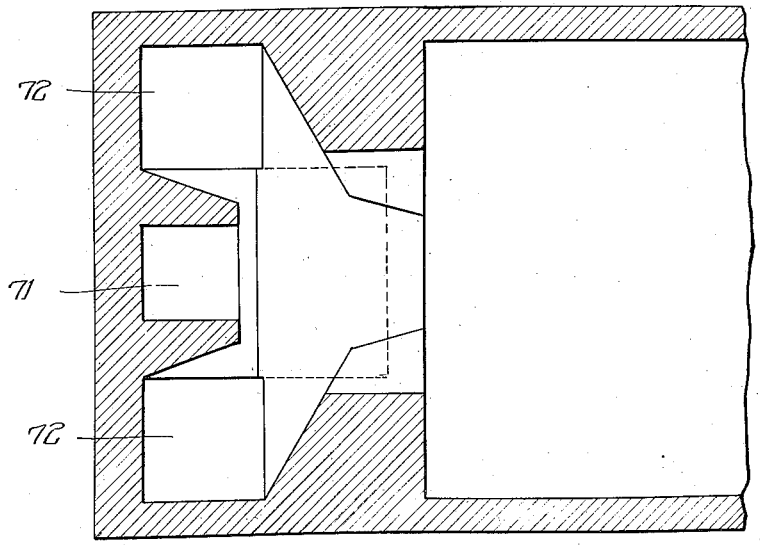

In the form of device shown in Figures 11 and 12, the gas uptake 71 is flanked by the air uptake 72. A portion of the furnace roof above the gas uptake and portion of the adjacent port end is formed as a swinging damper 73 which is pivoted at 74 upon the back wall of the furnace. This roof portion is operable by means of the cable 75. The forward part of the damper is provided with an upwardly extending flange 76 which serves to prevent the passage of gases between the forward edge of the damper and the roof when the damper is in lowered position.

Figure 13:
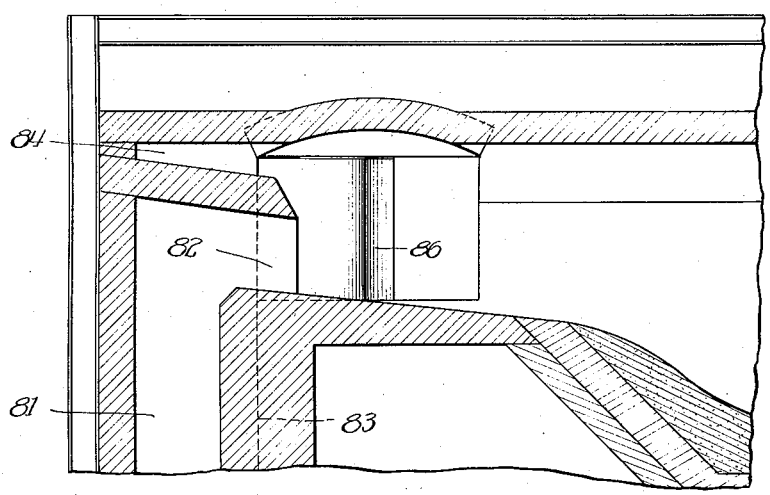
Figure 14:
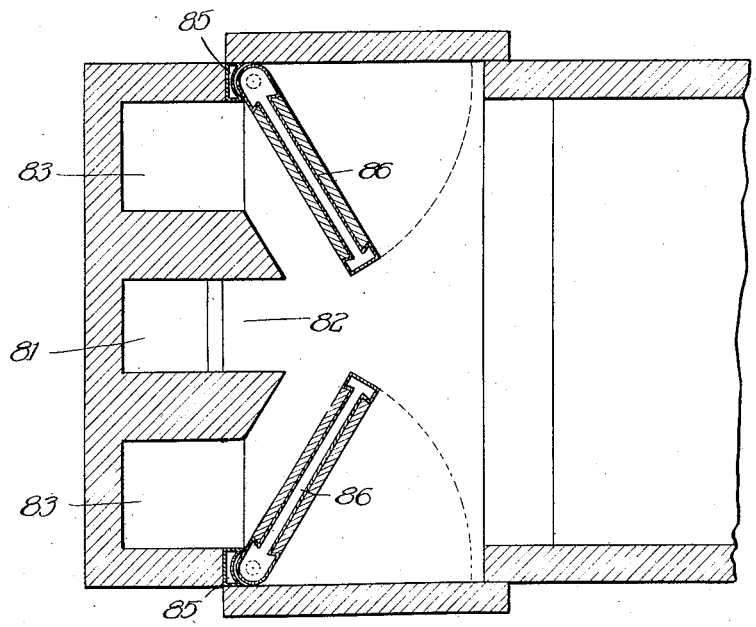

The form of device shown in Figures 13 and 14, comprises the gas uptake 81 terminating in the gas port 82. The air uptakes 83 are located upon either side of the gas uptake and meet at 84 above that uptake. Offsets are formed in the lateral walls of the furnace adjacent the air uptakes and water-cooled hinge plates 85 are located in these offsets. The water-cooled dampers 86 are swung upon these hinges and are adapted to be swung to a position such as that shown in Figure 14 to direct the incoming air inwardly against the incoming gas. Upon the outgoing end of the furnace, the dampers are swung outwardly parallel with the furnace wall and they thus permit the full area of the ports to be effective in carrying off the products of combustion.

These several forms of construction which I have shown all serve to restrict the effective passage area between the ports and the furnace upon the incoming end of the furnace. They thus cause a quick mingling of air and gas and a short flame upon the incoming end and further permit the ready discharge of the products of combustion through the full port area. Other and further modifications of my construction may be made and it is my intention to cover all variations coming within the spirit and scope of the appended claims.

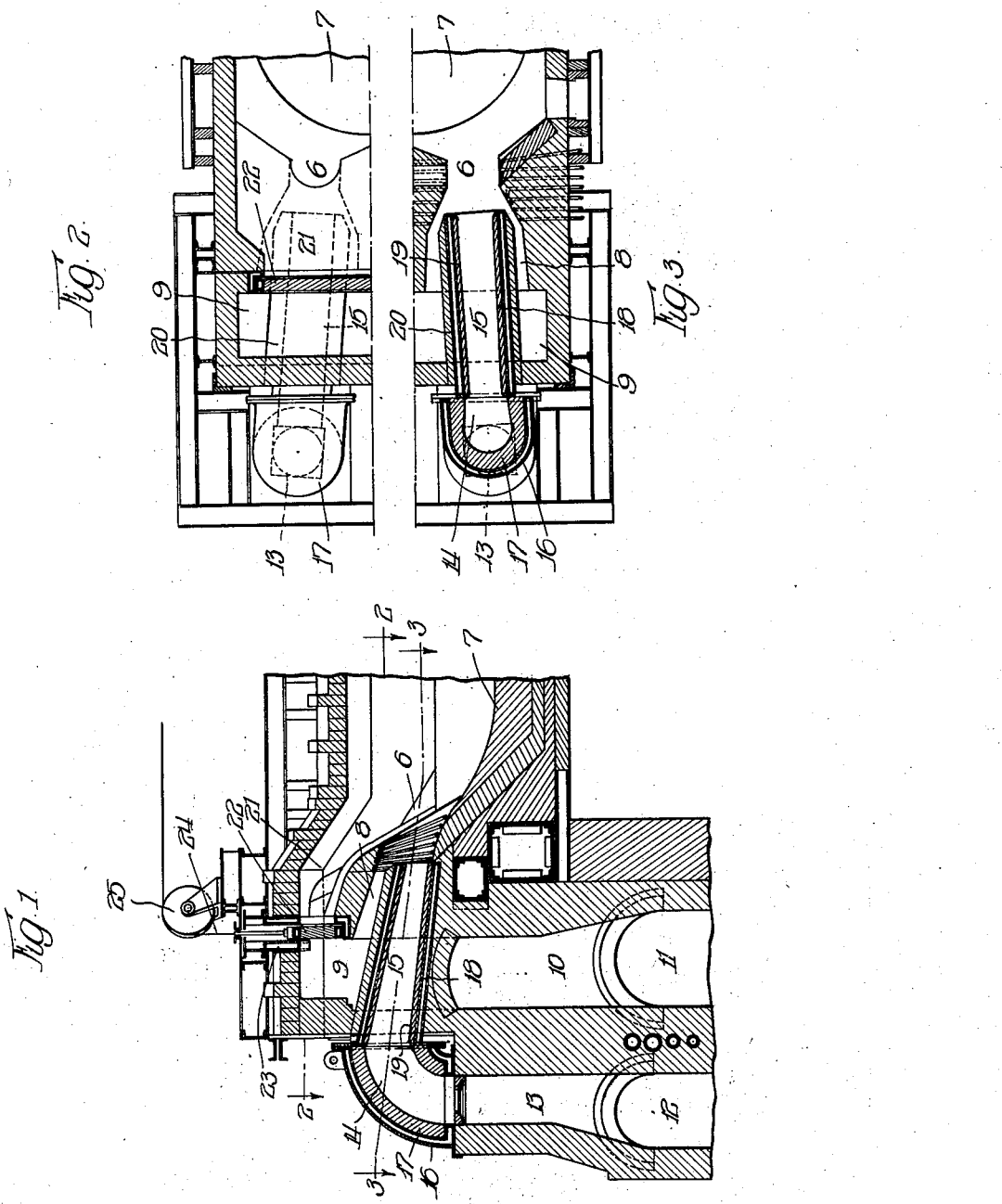

I claim:

1. In a metallurgical furnace, ports in the ends of the furnace adapted to serve alternately to introduce the incoming air and fuel and to conduct away the products of combustion, and means located intermediate the ports and the melting chamber of the furnace adapted to vary the effective passage area between ports and melting chamber.

2. In a metallurgical furnace, ports in the ends of the furnace adapted to serve alternately to introduce the incoming air and fuel and to conduct away the products of combustion, and means located intermediate the ports and the melting chamber of the furnace adapted to vary the effective passage area between ports and melting chamber, said means being adjustably introduced through the furnace roof.

3. In a metallurgical furnace, ports in the ends of the furnace adapted to serve alternately to introduce the incoming air and fuel and to conduct away the products of combustion, and means located intermediate the ports and the melting chamber of the furnace adapted to vary the effective passage area between ports and melting chamber, said means extending laterally into the furnace from each side thereof.

4. In a metallurgical furnace, ports in the ends of the furnace adapted to serve alternately to introduce the incoming air and fuel and to conduct away the products of combustion, and means located intermediate the ports and the melting chamber of the furnace adapted to vary the effective passage area between ports and melting chamber, said means extending laterally into the furnace from each side thereof, and being introduced through the furnace roof.

5. In a metallurgical furnace, a centrally located fuel port and air ports located laterally thereof, in each end of the furnace, said ports serving on the outgoing end to carry off the products of combustion, and means adapted to direct the air streams from the air ports toward the central fuel stream, said means being removable upon the outgoing end of the furnace.

6. In a metallurgical furnace, a centrally located fuel port and air ports located laterally thereof, in each end of the furnace, said ports serving on the outgoing end to carry off the products of combustion, and dampers adapted to be inserted adjacent the air ports to direct the air streams toward the central gas stream.

7. In a metallurgical furnace, a centrally located fuel port and air ports located laterally thereof, in each end of the furnace, said ports serving on the outgoing end to carry off the products of combustion, and dampers adapted to be inserted adjacent the air ports to direct the air streams toward the central gas stream, said dampers being capable of being fully withdrawn to render the full area of the ports available upon the outgoing end of the furnace.

8. In a metallurgical furnace, a centrally located fuel port and air ports located laterally thereof, in each end of the furnace, said ports serving on the outgoing end to carry off the products of combustion, and dampers extending inwardly from the sides of the furnace in front of and adjacent the air ports and adapted to direct the air streams toward the central gas stream.

9. In a metallurgical furnace, ports in the ends of the furnace adapted to serve alternately to introduce the incoming air and fuel and to conduct away the products of combustion, and means located intermediate the ports and the melting chamber of the furnace adapted to vary the effective passage area between ports and melting chamber, said means comprising vertically movable dampers guided in the furnace roof and said side walls.

10. An open hearth furnace having in combination regenerating chambers adapted to be alternately connected to an air supply and stack, a heating chamber, passages connecting said chamber to the respective regenerating chambers, means for restricting the cross-sectional areas of said passages, means for simultaneously shifting a restricting means to open position in one passage and to restricting position in the other passage, and means for introducing gas into said passages at points anterior to the position of the restricting means.

Signed at Chicago, Illinois, this 21st day of September, 1921.

GEORGE L. DANFORTH, Jr.